United States Patent Office 2,726,263
Patented Dec. 6, 1955

2,726,263
PREPARATION OF THIOCARBOHYDRAZIDE

Ludwig F. Audrieth, Urbana, Ill., and Perry Ross Kippur, Buffalo, N. Y., assignors to University of Illinois Foundation, Urbana, Ill., a corporation of Illinois No Drawing. Application June 1, 1953,
Serial No. 358,957

8 Claims. (Cl. 260—552)

This invention relates generally to thiocarbohydrazide and more particularly to a novel method for preparing the same.

Thiocarbohydrazide, represented by the chemical formula $S=C(NHNH_2)_2$, is useful in insecticides, fungicides and various agricultural chemicals as well as in chemical laboratories as a chemical reagent. Its use in commerce has been grossly retarded, however, because only costly complex processes have been available for its manufacture.

It is therefore an object of this invention to provide a novel process for making thiocarbohydrazide. Another object of the invention is to provide a process for making thiocarbohydrazide from hydrazinium dithiocarbazinate. A further object of the invention is to provide a process for making thiocarbohydrazide from commercially available raw materials.

In accordance with this invention the foregoing objects as well as others are accomplished, generally speaking, by providing a process wherein hydrazinium dithiocarbazinate is heated under reflux together with hydrazine to form thiocarbohydrazide. It has been found that the conversion of hydrazinium dithiocarbazinate is accelerated and the yield of thiocarbohydrazide thus obtained is improved if the hydrazinium dithiocarbazinate is heated at atmospheric pressure under reflux in solution in the presence of hydrazine. The invention thus provides a commercially feasible process for making thiocarbohydrazide and, in a preferred embodiment, the invention contemplates a process wherein carbon disulfide and hydrazine are reacted and the resulting hydrazinium dithiocarbazinate is heated while mixed with hydrazine under reflux to remove hydrogen sulfide and to form thiocarbohydrazide, although hydrazinium dithiocarbohydrazinate prepared by any other suitable method can be converted into thiocarbohydrazide in accordance with this invention. This can be accomplished either by first isolating the dithiocarbazinate and then mixing it with hydrazine and heating under reflux, or by merely adding an excess of hydrazine at the start of the reaction with carbon disulfide and heating the reaction mixture under reflux. Some hydrazinium dithiocarbazinate is converted into thiocarbohydrazide almost immediately after it is heated in the presence of hydrazine to approximately the solution's refluxing temperature, ordinarily about 95° C. if it is in aqueous solution, but a total refluxing period for at least about one hour is preferred to obtain the optimum yield of thiocarbohydrazide. Ordinarily there is no advantage in continuing the refluxing period beyond about two hours. Any amount of hydrazine sufficient to make the solution alkaline during the refluxing period is effective in bringing about the conversion of hydrazinium dithiocarbazinate into thiocarbohydrazide but best results are obtained if from about one to three moles hydrazine are utilized per mole hydrazinium dithiocarbazinate.

The conversion of hydrazinium dithiocarbazinate into thiocarbohydrazide is represented by the following chemical equation:

$$N_2H_4 \cdot HSCSN_2H_3 \rightarrow H_2S + CS(N_2H_3)_2$$

In order to better describe and to further clarify the invention the following is a description of one embodiment thereof:

About 28 parts hydrazinium dithiocarbazinate is dissolved in about 160 parts water and is then mixed with about 200 parts of a solution containing about 35.5 parts of 85% hydrazine hydrate. The resulting solution is refluxed for about one and one-half hours at a temperature of about 95° C. after which time the solution is allowed to cool to room temperature. The precipitate formed is separated from the liquid by filtering, centrifuging or similar process and, after air drying, about 12.2 parts thiocarbohydrazide are recovered.

In another embodiment of the invention, about 50 parts hydrazine hydrate is cooled to about the temperature of ice water and about 15 parts carbon disulfide is added slowly while the hydrazine solution is being vigorously agitated. About 160 parts water are then added and the reaction mixture is heated to reflux temperature or to about 95° C. The reaction mixture is maintained at that temperature for about one and one-half hours after which time the solution is permitted to cool to room temperature. As the solution cools, thiocarbohydrazide precipitates therefrom and is separated from the liquid by filtering. About 10.7 parts thiocarbohydrazide are obtained.

In other embodiments similar to the foregoing with the exception of time under reflux, a yield of about 11.3 parts thiocarbohydrazide was obtained with about one hour reflux and about 11.7 parts thiocarbohydrazide was obtained with about two hours reflux.

In another embodiment, the hydrazinium dithiocarbazinate can be converted into thiocarbohydrazide by removing the thiocarbohydrazide substantially as fast as it is formed. For instance, it can be done by subjecting the solution containing the hydrazinium dithiocarbazinate and hydrazine to a plurality of reflux periods of short duration with intermediate cooling and separation of the product. Ordinarily even higher yields are obtained from such an intermittent process.

Inasmuch as a method is provided for making thiocarbohydrazide from commercially available materials in conventional equipment, the process provided by this invention is adaptable to commercial production of thiocarbohydrazide. While yields of from about 40 per cent to about 70 per cent of theoretical based on the moles of hydrazinium dithiocarbazinate used have been obtained in accordance with the process of this invention, completely impractical yields of thiocarbohydrazide are obtained when no hydrazine is included with the hydrazinium dithiocarbazinate in the solution being refluxed.

In embodiments wherein carbon disulfide and hydrazine in excess of that required to react with the carbon disulfide are utilized and the reaction liquor is heated under reflux to form thiocarbohydrazide as in the foregoing, ratios of from three to about six moles hydrazine per mole of carbon disulfide give satisfactory results although five moles hydrazine is preferred in order to obtain optimum yield while insuring that some hydrazine will be present throughout the refluxing period. The reaction can be conducted in reaction mediums other than water, for instance solvents for hydrazine, such as the alcohols, like methyl, ethyl and propyl, but such do not appear to offer advantage over an aqueous solution.

While the invention has been described in detail in the foregoing, modifications and variations will occur to those skilled in the art and can be made therein without departing from the scope and spirit of the invention.

Having thus described the invention, what is claimed and desired to secure by Letters Patent is:

1. In the manufacture of thiocarbohydrazide by a process which involves heating a solution of hydrazinium dithiocarbazinate and thereafter segregating the resulting thiocarbohydrazide from the liquid medium, the improvement which comprises refluxing said solution and simultaneously maintaining hydrazine solute in said solution throughout the refluxing.

2. The process for making thiocarbohydrazide which comprises reacting carbon disulfide with hydrazine to form hydrazinium dithiocarbazinate, thereafter heating the reaction mixture under reflux and simultaneously maintaining hydrazine solute in the solution throughout the refluxing, cooling the solution to precipitate the resulting thiocarbohydrazide, and thereafter separating the precipitate from the reaction liquor.

3. The process of claim 2 wherein at least three moles of hydrazine are used per mole of carbon disulfide, and the hydrazine not reacting with the carbon disulfide is that retained in the solution throughout the refluxing period.

4. The process for making thiocarbohydrazide which comprises reacting carbon disulfide with hydrazine to form hydrazinium dithiocarbazinate, thereafter heating the reaction mixture under reflux for at least one hour and simultaneously maintaining some hydrazine solute in the solution, cooling the solution until the resulting thiocarbohydrazide has precipitated, and thereafter separating the precipitate from the reaction liquor.

5. The process of claim 4 wherein at least about three moles hydrazine are used for each mole carbon disulfide, and the hydrazine not reacting with the carbon disulfide is that retained as a solute in the solution throughout the refluxing period.

6. In the manufacture of thiocarbohydrazide the improvement which comprises heating a solution of hydrazinium dithiocarbazinate and hydrazine under reflux for at least about one hour, cooling the solution to precipitate the resulting thiocarbohydrazide and thereafter separating the precipitate from the reaction liquor.

7. The process for converting hydrazinium dithiocarbazinate into thiocarbohydrazide which comprises heating an aqueous solution of hydrazinium dithiocarbazinate in the presence of hydrazine solute to a refluxing temperature in the neighborhood of about 95° C., removing hydrogen sulfide from the hydrazinium dithiocarbazinate and thus converting said hydrazinium dithiocarbazinate into thiocarbohydrazide by refluxing the solution for at least about one hour, cooling the solution until the resulting thiocarbohydrazide has precipitated and thereafter separating the precipitate from the reaction liquor.

8. In a process for converting hydrazinium dithiocarbazinate into thiocarbohydrazide which involves heating a solution of said hydrazinium dithiocarbazinate, the improvement which comprises the combination of heating said solution to a refluxing temperature and refluxing the solution a plurality of times with intermediate cooling and segregation of the product from the liquid medium, and simultaneously maintaining hydrazine solute in the solution throughout the refluxing.

References Cited in the file of this patent

Stolle et al.: Ber. Deut. Chem. 41, 1099 (1908).

H. Weiland: Die Hydrazine, pp. 213 and 220 (1913 ed).